(12) United States Patent
Takemoto

(10) Patent No.: US 7,439,476 B2
(45) Date of Patent: Oct. 21, 2008

(54) MIRROR ANGLE CONTROL SYSTEM

(75) Inventor: Seiji Takemoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 296 days.

(21) Appl. No.: 11/472,465

(22) Filed: Jun. 22, 2006

(65) Prior Publication Data

US 2006/0291063 A1    Dec. 28, 2006

(30) Foreign Application Priority Data

Jun. 23, 2005  (JP) .............................. 2005-182745

(51) Int. Cl.
*G01J 1/20* (2006.01)
*G11B 7/00* (2006.01)

(52) U.S. Cl. .................. 250/201.1; 369/44.14

(58) Field of Classification Search ............... 250/201.1
See application file for complete search history.

(56) References Cited

U.S. PATENT DOCUMENTS 4,556,964 A * 12/1985 Trethewey ............... 369/44.14

FOREIGN PATENT DOCUMENTS

| JP | A-2003-077154 | 3/2003 |
|---|---|---|
| JP | A-2004-212205 | 7/2004 |

* cited by examiner

*Primary Examiner*—F. L Evans
(74) *Attorney, Agent, or Firm*—Morgan, Lewis & Bockious LLP

(57) ABSTRACT

Conventional mirror angle control systems require a detection mirror separate from a deflection mirror. Depending on the accuracy with which these mirrors are fitted relative to each other, in products incorporating such control systems, degraded control accuracy may result. Moreover, a separate light source is needed for shining laser light on the detection mirror. This makes it difficult to miniaturize products incorporating these control systems, and leads to increased electric power consumption. To overcome these disadvantages, in the mirror angle control system of the invention, light from a light source is shone on a mirror, and part of the light reflected therefrom is condensed, with a reflective hologram, on a light receiver. Then, based on an electrical signal commensurate with the inclination angle of the mirror as outputted from the light receiver and a target signal, a drive signal is fed to a driver that drives the mirror to rotate.

12 Claims, 5 Drawing Sheets

MIRROR ANGLE CONTROL SYSTEM

This application is based on Japanese Patent Application No. 2005-182745 filed on Jun. 23, 2005, the contents of which are hereby incorporated by reference.

BACKGROUND OF THE INVENTION

1. Field of the Invention

The present invention relates to a mirror angle control system for use in disc apparatuses, optical communication systems, and the like.

2. Description of Related Art

Conventionally, mirror angle control systems are used for the purposes of, among others, controlling tracking in disc apparatuses and controlling optical signal switches in optical communication systems.

For example, according to JP-A-2004-212205, a rotary mirror has a deflecting mirror surface and a detection reflective surface formed on the obverse and reverse sides of a rotatable plate-shaped member. Laser light from a light source is shone on the detection reflective surface, and the light reflected therefrom is received with a photoreceptor. Then, based on the position of the spot formed as a result on the photoreceptive surface of the photoreceptor, the inclination angle of the detection reflective surface is detected. Then, the inclination angle thus detected is converted into an equivalent deflection angle of the deflecting mirror surface. Then, based on the difference of this actually calculated deflection angle from the target deflection angle, the rotary mirror is controlled with an actuator on a feedback basis.

On the other hand, according to JP-A-2003-77154, a coil folder built as a movable member has a deflection mirror and a detection mirror fitted on the observe and reverse sides thereof. Laser light from a light source is shone on the detection mirror, and the light reflected therefrom is received with a photoreceptor. Then, based on the position of the spot formed as a result on the photoreceptive surface of the photoreceptor, the inclination angle of the detection mirror, hence the inclination angle of the deflection mirror, is detected. Then, based on the thus detected angle, the inclination angle of the deflection mirror is adjusted.

Disadvantageously, however, the mirror angle control systems disclosed in the patent publications mentioned above both require a detection mirror separate from a deflection mirror, and, depending on the accuracy with which these mirrors are fitted relative to each other, an error may be involved in the control of the inclination angle of the deflection mirror. As a result, a fault may occur in whatever product incorporates one of those control systems, for example, in the control of tracking in a disc apparatus or in the control of optical switching in an optical communication system.

Also disadvantageously, these control systems require, separate from a light source for shining laser light on a deflection mirror, another light source for shining laser light on a detection mirror. This makes it difficult to miniaturize products that incorporate the control systems, and also leads to increased electric power consumption.

SUMMARY OF THE INVENTION

An object of the present invention is to provide a mirror angle control system that contributes to higher control accuracy, miniaturization, and reduced electric power consumption in products that incorporate it.

To achieve the above object, according to the present invention, a mirror angle control system is provided with:

a light source;
a mirror that reflects the light outputted from the light source;
a driver that drives the mirror to rotate;
a light receiver;
a light condenser that condenses part of the light reflected from the mirror on the light receiver;
a control/calculation circuit that produces a control signal based on an electrical signal commensurate with the inclination angle of the mirror as outputted from the light receiver and a target signal; and
a drive circuit that produces a drive signal based on the control signal and that then feeds the drive signal to the driver With this configuration, there is no need for a detection mirror. This contributes to higher control accuracy in products that incorporate the control system. Also, there is no need for a light source for shining light on a detection mirror. This contributes to miniaturization and reduced electric power consumption in products that incorporate the control system.

The mirror angle control system according to the present invention may comprise a MEMS (microelectromechanical system) mirror of which the mirror portion is the above-mentioned mirror and of which the driver portion is the above-mentioned mirror driver.

With this configuration, the mirror angle control system according to the present invention is suitable for control that requires high-accuracy, high-speed positioning, such as the control of tracking in disc apparatuses.

In the mirror angle control system according to the present invention, the MEMS mirror, the light receiver, the control/calculation circuit, and the drive circuit may be formed on the same substrate. This contributes to miniaturization and enhanced fitting accuracy.

In the mirror angle control system according to the present invention, the light condenser may be a reflective hologram. This helps reduce the number of components needed in the light condenser, and thus contributes to miniaturization in products that incorporate the control system.

DETAILED DESCRIPTION OF PREFERRED EMBODIMENTS

Figure 1:
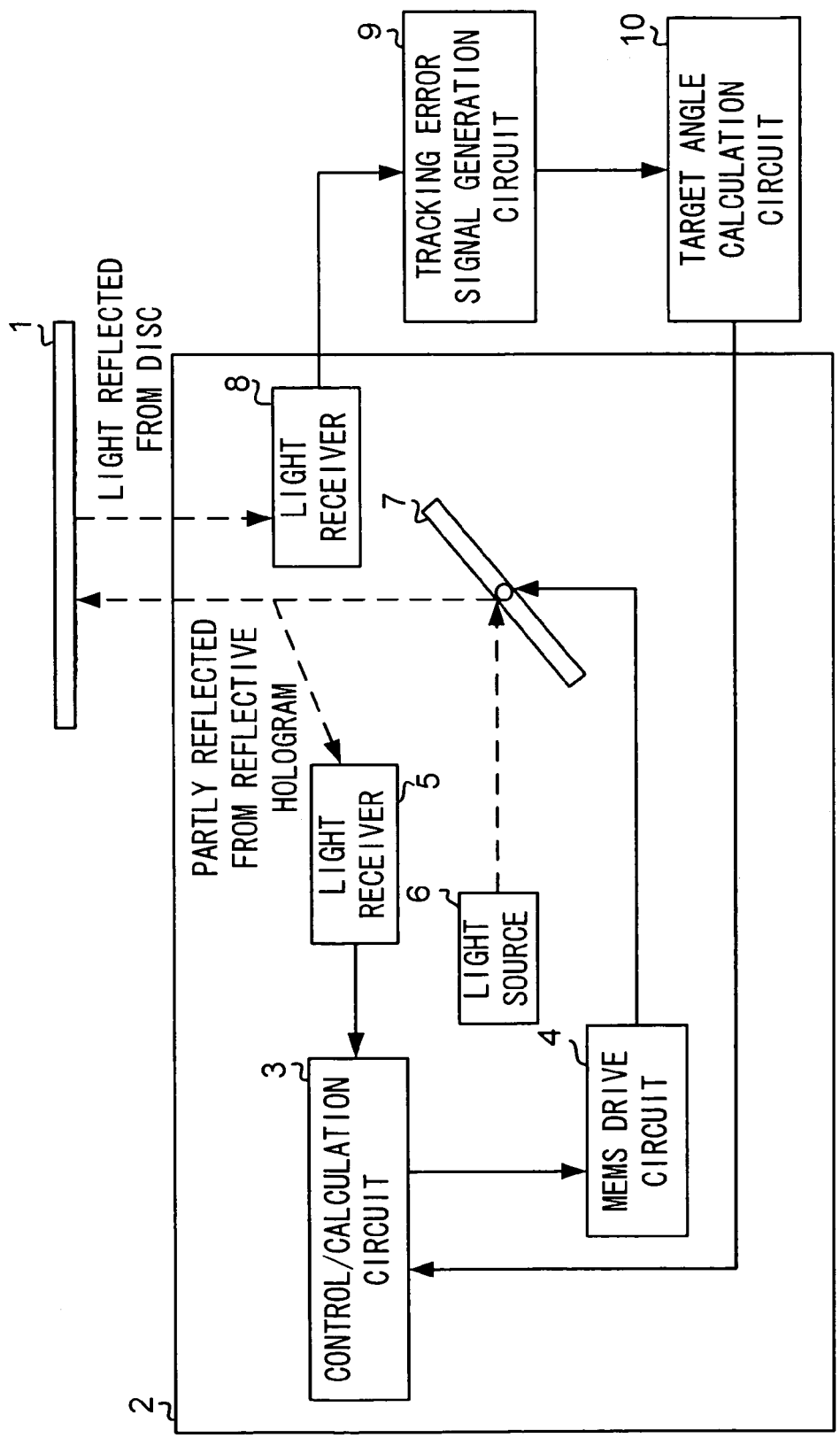
FIG. 1 is a block diagram of a tracking control system of a disc apparatus.

Hereinafter, the present invention will be described by way of an embodiment that deals with tracking control in a disc apparatus. FIG. 1 is a block diagram of a tracking control system in a disc apparatus.

The tracking control system is composed of a disc 1, a pickup 2, a tracking error signal generation circuit 9, and a target angle calculation circuit 10. The pickup 2 is provided with a light source 6, a MEMS (microelectromechanical system) mirror 7, a light receiver 5, a light receiver 8, a control/calculation circuit 3, and a MEMS drive circuit 4.

The light source 6 outputs laser light, which is then reflected on a mirror portion, described later, of the MEMS mirror 7. The reflected light then strikes a recording surface of the disc 1, and the light reflected from the disc 1 is received by the light receiver 8. The optical system here, which is housed inside the pickup 2, is shown in detail in FIG. 2.

The laser light outputted from the light source 6 is first transmitted through a polarizing beam splitter (PBS) 11, and is then reflected from the mirror portion of the MEMS mirror 7. The laser light reflected from the mirror portion of the MEMS mirror 7 is then formed into a parallel beam by a collimator lens 12, is then transmitted through a quarter-wave plate 13, and is then condensed on the recording surface of the disc 1 by an objective lens 14. The laser light reflected from the disc 1 is transmitted through the objective lens 14, then through the quarter-wave plate 13, and then through the collimator lens 12, and is then reflected from the mirror portion of the MEMS mirror 7. The light reflected here has been transmitted through the quarter-wave plate 13 twice, and is therefore now reflected from the polarizing beam splitter 11, and is then condensed on the light receiver 8. Here, the mirror portion of the MEMS mirror 7 is rotatable as indicated by arrows in FIG. 2 so that, as the inclination angle thereof varies, the angle at which the laser light is reflected varies and accordingly the spot on the recording surface of the disc 1 moves across a radius of the disc.

The light receiver 8 is a photodetector having split sensing areas. The laser light condensed on the light-receiving surface of the light receiver 8 is converted into an electrical signal, which is then fed to the tracking error signal generation circuit 9 (FIG. 1). From the electrical signal fed thereto, the tracking error signal generation circuit 9 produces a tracking error signal, and feeds it to the target angle calculation circuit 10. Based on the tracking error signal fed thereto, the target angle calculation circuit 10 produces a target angle level signal such that it is commensurate with the target inclination angle of the mirror portion of the MEMS mirror 7 which is supposed to cancel out the tracking error, and then feeds it to the control/calculation circuit 3.

Next, how the inclination angle of the mirror portion of the MEMS mirror 7 is controlled will be described.

Figure 3:
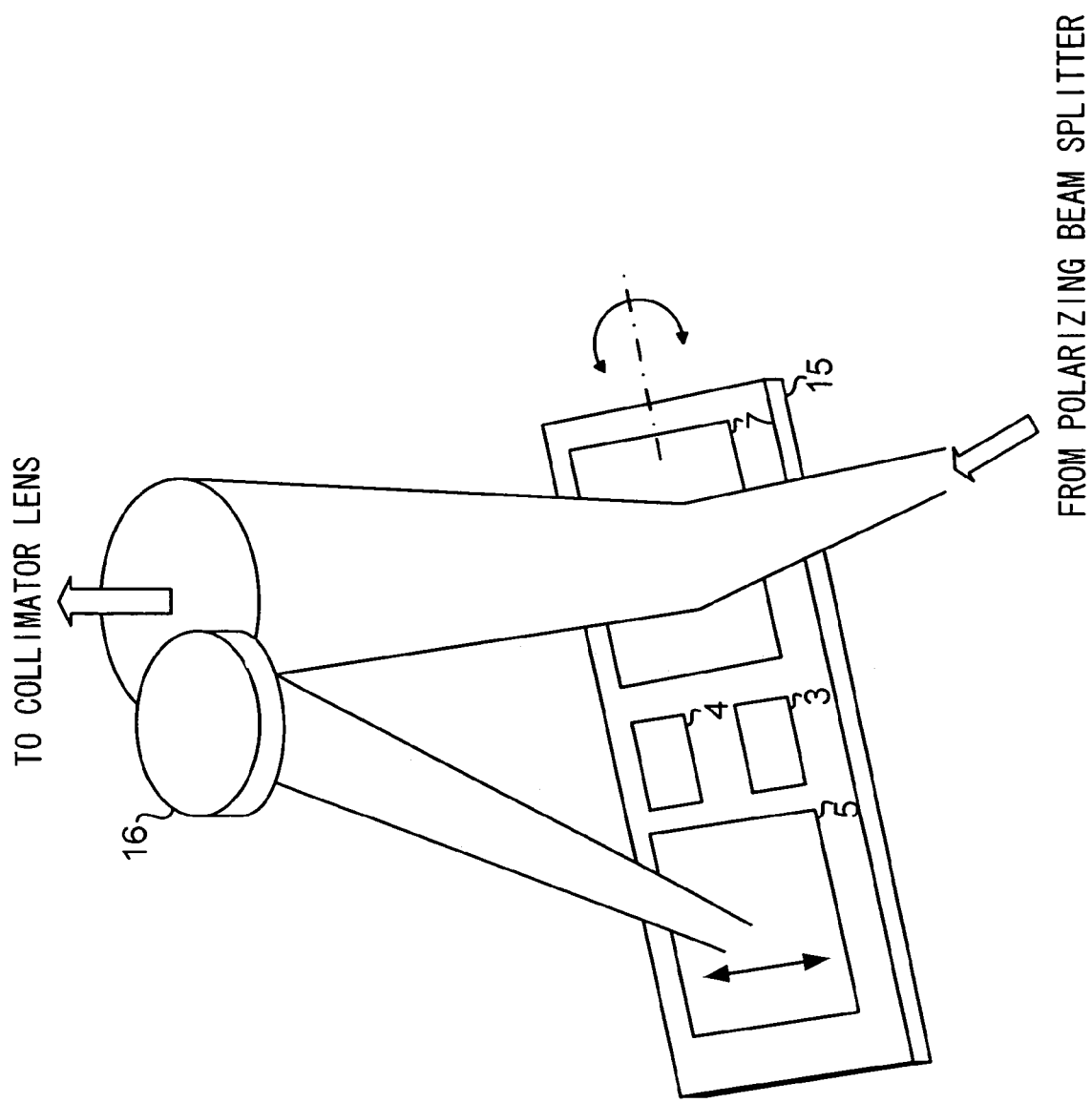
FIG. 3 is an exterior view of parts inside the pickup which are involved in mirror angle control.

FIG. 3 is an exterior view of parts within the pickup 2 which are involved in mirror angle control. As shown in FIG. 3, the MEMS mirror 7, the light receiver 5, the control/calculation circuit 3, and the MEMS drive circuit 4 are formed on the same silicon substrate 15. Above the silicon substrate 15, a reflective hologram 16 is provided. The reflective hologram 16 is fixed to a resin package that houses the silicon substrate 15.

Figure 4:
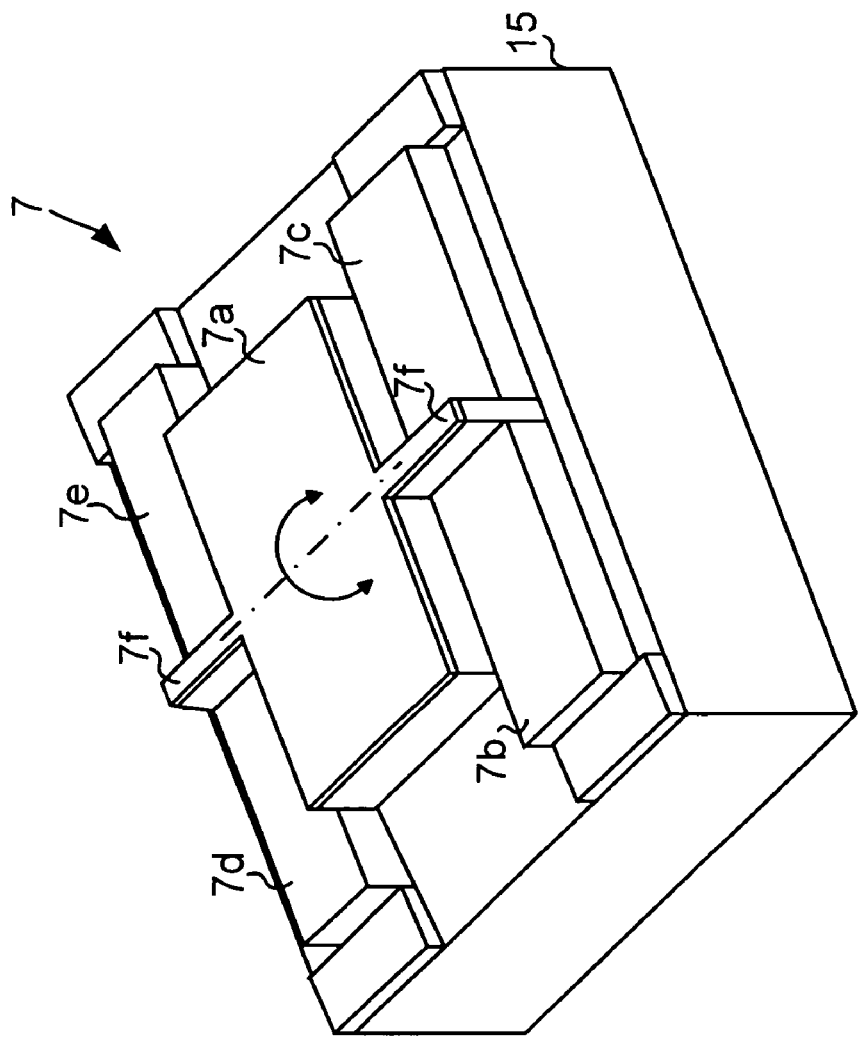
FIG. 4 is an exterior view of a MEMS mirror.

FIG. 4 shows the exterior appearance of the MEMS mirror 7 in detail. The MEMS mirror 7 is formed on the silicon substrate 15, which thus serves as a base thereof. The MEMS mirror 7 is provided with a mirror portion 7a, four driver portions 7b to 7e, and a rotary shaft portion 7f. The mirror portion 7a is formed by depositing a film of Al by a CVD process. The four driver portions 7b to 7e are formed by depositing and patterning a lower electrode, a PZT thin film, and an upper electrode with the same polarization direction in the four driver portions 7b to 7e. When voltages of opposite polarities are applied between the PZT thin films of the driver portions 7b and 7c and between those of the driver portions 7d and 7e, the PZT thin films bend under the piezoelectric effect, and the resulting strains produce a torque, which make the mirror portion 7a rotate about the rotary shaft portion 7f (as indicated by arrows in FIG. 4).

Figure 2:
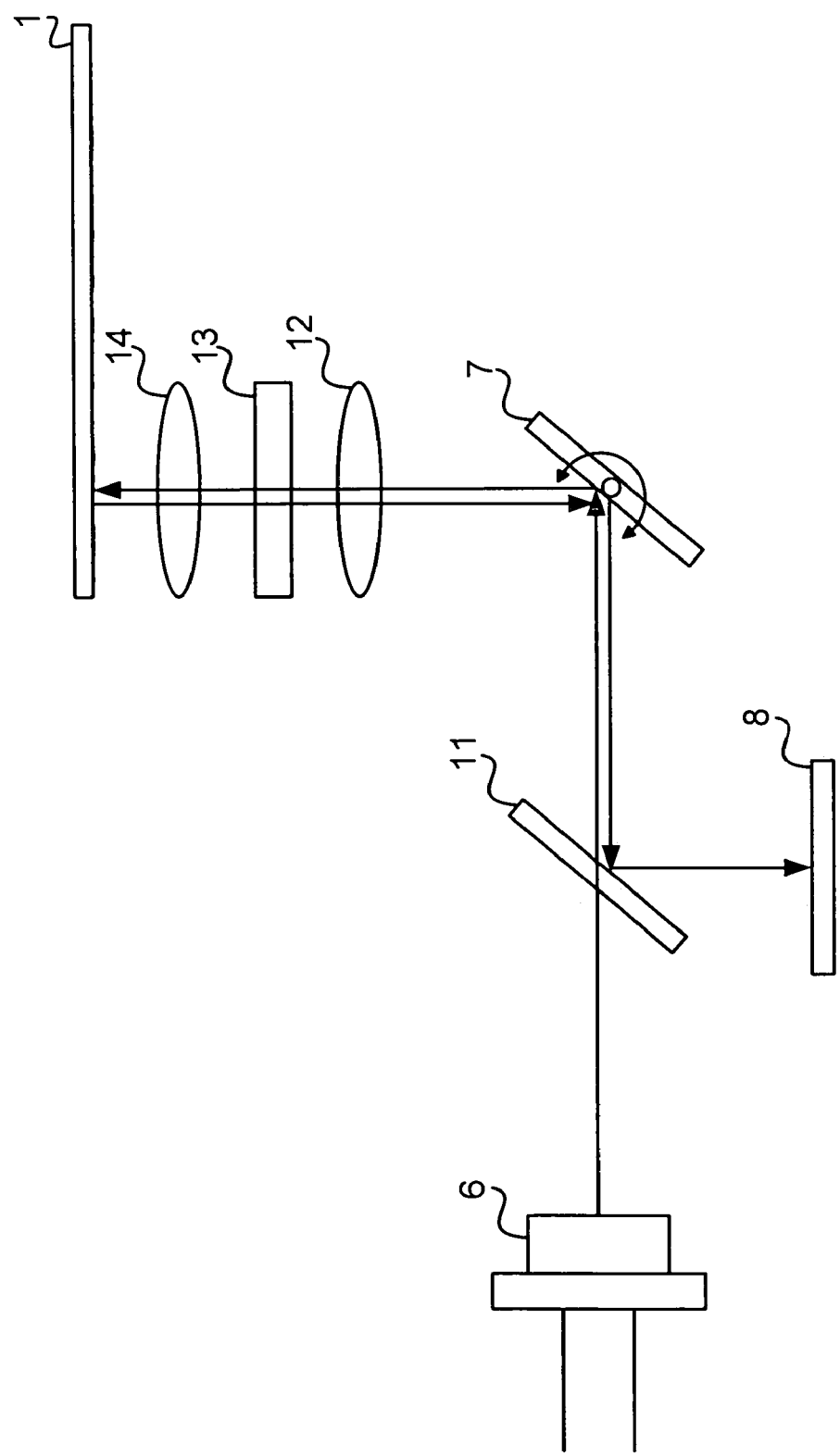
FIG. 2 is a diagram showing the configuration of the optical system inside a pickup.
Figure 5:
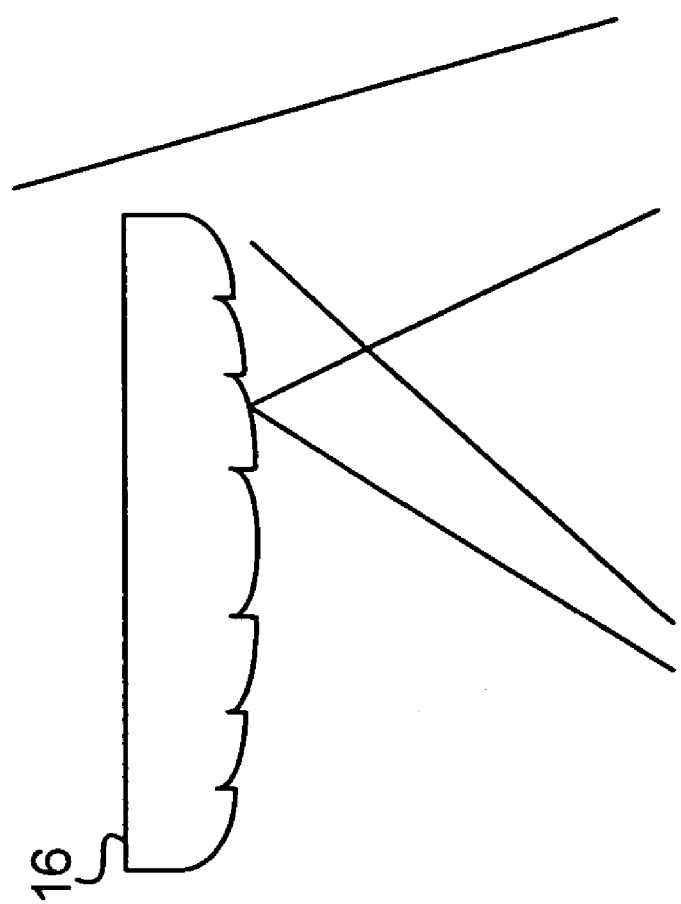
FIG. 5 is a side cross-sectional view of a reflective hologram, showing how it reflects the incident light to condense it.

The laser light outputted from the light source 6 is transmitted through the polarizing beam splitter 11, is then reflected from the mirror portion 7a of the MEMS mirror 7, and then enters the collimator lens 12 (FIG. 2). Here, part of the light directed to the collimator lens 12 strikes the reflective hologram 16. As shown in FIG. 5, the reflective hologram 16 has grooves that give it a serrate cross-sectional shape. The reflective hologram 16 thus reflects the incident laser light so as to condense it.

This part of the laser light, that is, the part that has branched off the laser light directed to the collimator lens 12 and then has been reflected from the reflective hologram 16, is thus condensed on the light-receiving surface of the light receiver 5 formed on the silicon substrate 15. The light receiver 5 may be a photodetector having split sensing areas, or a PSD (position-sensitive detector) having an unsplit sensing area. As the mirror portion 7a of the MEMS mirror 7 rotates as indicated by arrows in FIG. 3, the spot on the light-receiving surface of the light receiver 5 moves one dimensionally as indicated by arrows in FIG. 3. Thus, the light receiver 5 outputs an electrical signal that is commensurate with the inclination angle of the mirror portion 7a of the MEMS mirror 7.

The electrical signal outputted from the light receiver 5 is fed to the control/calculation circuit 3. Based on this electrical signal, the control/calculation circuit 3 then produces an angle detection level signal commensurate with the inclination angle of the mirror portion 7a of the MEMS mirror 7. The control/calculation circuit 3 then calculates the difference between this angle detection level signal and the target angle level signal, mentioned previously, fed from the target angle calculation circuit 10. The control/calculation circuit 3 then processes the calculated difference with amplification, differentiation, integration, and other processing to produce a control signal, and then outputs it to the MEMS drive circuit 4.

Based on this control signal, the MEMS drive circuit 4 produces a drive signal, and then feeds it to the driver portions 7b to 7e of the MEMS mirror 7. Now, according to the driving signal, the mirror portion 7a of the MEMS mirror 7 rotates and thereby moves the spot condensed on the recording surface of the disc 1 across a radius of the disc.

Through the sequence described above, the inclination angle of the mirror portion 7a of the MEMS mirror 7 is controlled on a feedback basis to be kept at the target angle that cancels out the tracking error. This permits the spot condensed on the recording surface of the disc 1 to follow a desired track on the disc 1, and thereby achieves tracking control.

The present invention has been described hereinbefore by way of an embodiment that deals with tracking control in a disc apparatus. It should be understood, however, that mirror angle control systems according to the present invention can be used for any other purposes, such as the controlling of optical signal switches in optical communication systems.

What is claimed is:

1. A mirror angle control system comprising:
   a light source;
   a mirror that reflects light outputted from the light source;
   a driver that drives the mirror to rotate;
   a light receiver;
   a light condenser that condenses part of the light reflected from the mirror on the light receiver;
   a control/calculation circuit that produces a control signal based on an electrical signal commensurate with an inclination angle of the mirror as outputted from the light receiver and a target signal; and
   a drive circuit that produces a drive signal based on the control signal and that then feeds the drive signal to the driver.

2. The mirror angle control system of claim 1,
   wherein the mirror angle control system comprises a MEMS (microelectromechanical system) mirror of which a mirror portion is the mirror and of which a driver portion is the driver.

3. The mirror angle control system of claim 2,
wherein the MEMS mirror, the light receiver, the control/calculation circuit, and the drive circuit are formed on a same substrate.

4. The mirror angle control system of claim 1,
wherein the light condenser is a reflective hologram.

5. The mirror angle control system of claim 2,
wherein the light condenser is a reflective hologram.

6. The mirror angle control system of claim 3,
wherein the light condenser is a reflective hologram.

7. A disc apparatus including a mirror angle control system,
wherein the mirror angle control system comprises:
a light source;
a mirror that reflects light outputted from the light source;
a driver that drives the mirror to rotate;
a light receiver;
a light condenser that condenses part of the light reflected from the mirror on the light receiver;
a control/calculation circuit that produces a control signal based on an electrical signal commensurate with an inclination angle of the mirror as outputted from the light receiver and a target signal; and
a drive circuit that produces a drive signal based on the control signal and that then feeds the drive signal to the driver.

8. The disc apparatus of claim 7,
wherein the mirror angle control system comprises a MEMS (microelectromechanical system) mirror of which a mirror portion is the mirror and of which a driver portion is the driver.

9. The disc apparatus of claim 8,
wherein the MEMS mirror, the light receiver, the control/calculation circuit, and the drive circuit are formed on a same substrate.

10. The disc apparatus of claim 7,
wherein the light condenser is a reflective hologram.

11. The disc apparatus of claim 8,
wherein the light condenser is a reflective hologram.

12. The disc apparatus of claim 9,
wherein the light condenser is a reflective hologram.

* * * * *